United States Patent
Wilson et al.

[11] 3,936,040
[45] Feb. 3, 1976

[54] RESILIENT BUMPER

[75] Inventors: Richard Allen Wilson; William E. Foster, both of Pittsburgh, Pa.

[73] Assignees: Magee Plastics Company; Mitchell Plastics, Inc., both of Pittsburgh, Pa.; part interest to each

[22] Filed: Feb. 14, 1974

[21] Appl. No.: 442,756

[52] U.S. Cl.................................. 267/140; 206/.8
[51] Int. Cl............................................. F16f 7/12
[58] Field of Search.................. 267/140, 141, 153; 206/521, 437, 18, 182; 293/1, 60, 62, 63, 71 R, 71 P, 70, 72, 88; 61/48; 114/219; 198/195, 198

[56] References Cited
UNITED STATES PATENTS

| | | | |
|---|---|---|---|
| 500,955 | 7/1893 | Rusk | 206/.8 |
| 1,931,398 | 10/1933 | Smith, Jr. | 206/.8 |
| 2,081,511 | 5/1937 | Smith | 206/.8 |
| 2,263,063 | 11/1941 | Allen | 293/62 |
| 2,776,528 | 1/1957 | Niederer et al. | 198/198 |
| 3,013,516 | 12/1961 | Norman | 114/219 |
| 3,064,872 | 11/1962 | Skirow | 206/521 |
| 3,181,849 | 5/1965 | Mitchell | 267/140 |
| 3,237,757 | 3/1966 | Perkins | 198/198 |
| 3,301,335 | 1/1967 | Snelling | 267/141 |
| 3,353,812 | 11/1967 | Miller | 267/140 |
| 3,449,917 | 6/1969 | Roskopf | 293/71 R |
| 3,638,985 | 1/1972 | Barten et al. | 293/71 R |
| 3,857,478 | 12/1974 | Meeusen | 198/195 |

*Primary Examiner*—James B. Marbert
*Attorney, Agent, or Firm*—William J. Ruano

[57] ABSTRACT

A resilient bumper for protecting vehicles and stationary objects against collisions comprising a plurality of spaced, adjacent fins of flexible resilient material which are so spaced that the fins abut against each other progressively as the result of an impact and thus offer progressively higher resistance as each fin contacts an adjacent fin. The fins are preferably of tough rubber or plastic material having high ultimate elongation at low temperatures, high tear strength over a wide temperature range, and high abrasion resistance.

The fins may be disposed on corners of a vehicle or other objects to be protected or may be on flat, circular or other shapes. The fins may be of various shapes and may be offset or staggered relative to each other.

11 Claims, 11 Drawing Figures

RESILIENT BUMPER

This invention relates to a resilient bumper for protecting parts of a vehicle or other conveyance or of stationary objects subject to impact by vehicles or conveyances.

An outstanding disadvantage of resilient bumpers that have been used in the past is that they are designed to yield only upon attainment of a predetermined impact force, and suddenly, therefore giving uncomfortable jolts upon vehicular impact and minimum protection of the object on which the bumper is mounted.

Another disadvantage is that the materials used, usually rubber, do not withstand wide ranges of temperatures and usually become brittle with loss of flexibility and tear strength at very low temperatures, such as those below 0° F.

An object of the present invention is to overcome the abovenamed disadvantages of prior resilient bumpers.

A more specific object of the present invention is to provide a novel resilient bumper offering progressively greater resistance to impact, even before the flexible portions are flexed to their limit, therefore giving progressive and a higher degree of cushioning and lesser shock than possible heretofore.

Another object of the invention is to provide a novel resilient bumper made of finned plastic material which withstands very wide ranges of temperatures, even those below 0° F. without sacrificing resiliency, tear strength or other desirable characteristics.

Other objects and advantages will become more apparent from a study of the following description, taken with the accompanying drawings wherein.

Figure 1:
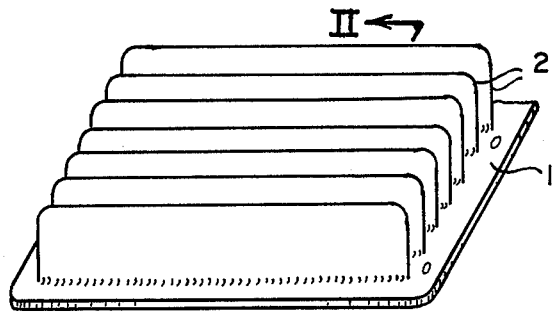
FIG. 1 is a top, perspective view of a resilient bumper embodying the present invention as applied to a flat surface.
Figure 2:
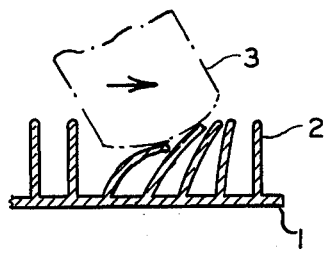
FIG. 2 is a cross-sectional view taken along line II-II of FIG. 1.

Referring more particularly to the drawings, FIGS. 1 and 2 show a resilient bumper adapted for use on a flat surface. The bumper comprises a base portion 1 having a plurality of upstanding, integral fins 2 of tough resilient material. More specifically, the material should have high ultimate elongation at low temperatures (that is, more than 300% elongation at 0° F.); high tear strength over a wide temperature range (specically, a tear strength of more than 400 pounds per linear inch in the temperature range 0° to 125°F.); and, high abrasion resistance (the specifics here have to do with weight loss under a standard test).

Another suitable material is plastic, particularly urethane elastomers such as described in U.S. Pat. Nos. 2,778,810; 2,729,618; 2,621,166; and 3,214,411. A particularly suitable material is that sold under the trademark TEXIN 591A by the Mobay Chemical Co., Division of Baychem Corporation of Pittsburgh, Pa. Such Texin urethane resin is a pelleted elastomeric urethane resin which can be processed as a thermoplastic. In molded sheet form, it has an ultimate tensile strength of 7700 psi; ultimate elongation of 540% elongation set of 65%; tensile modulus of 1250 psi at 100% elongation, and 3000 at 300% elongation; a tear strength of 650 pli and a shore hardness A scale of 91 plus or minus 3.

While FIG. 2 shows the fins 2 as extending vertically upwardly, they may be slanted either toward the right or left, depending upon the direction of the expected impact. The fins 2 are so spaced apart as to enable the outer portion of each fin to flex and abut against an outer portion of an adjoining fin which, in turn, abuts an outer portion of the next adjoining fin, etc. in the manner illustrated in FIG. 2 when an object 3 is moving to the right collides with the bumper. Thus the resistance to the object becomes progressively higher as more and more fins are bent until supported by an adjoining fin so as to provide progressively higher cushioning and elimination of sudden shock as usually occurs when hitting a conventional bumper. Even when all the fins are flexed into respective contact, the flexed assembly, as a whole, will still provide progressively higher resistance as the fins are forced against the base portion 1.

Figure 3:
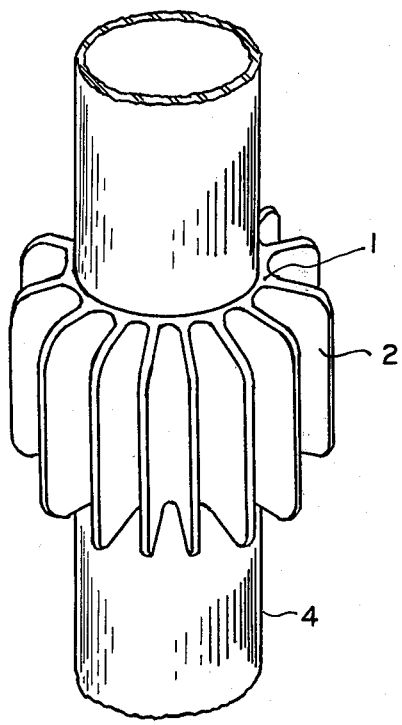
FIG. 3 is a top, perspective view of a modification as applied to the perimeter of a round post.

FIG. 3 shows a bumper of the construction shown in FIGS. 1 and 2 as applied around a round post 4 to give protection throughout the entire perimeter.

Figure 5:
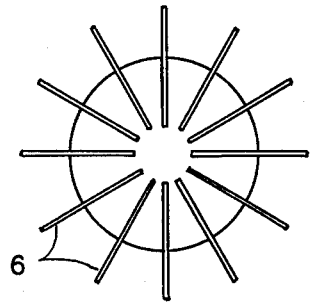
FIGS. 4 and 5 are side and top views, respectively, with portions cut-away, illustrating the bumper as applied to the top of a round post.
Figure 4:
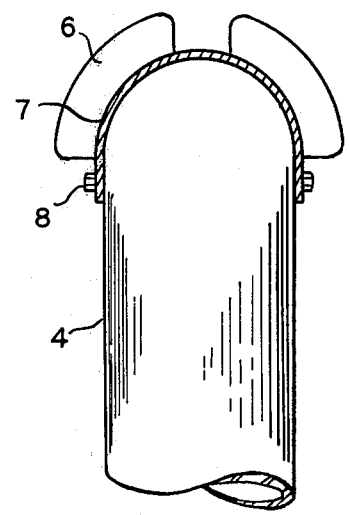

FIGS. 4 and 5 show the post as being protected on its rounded top end by a modified cluster of fins 6 which are disposed radially of the post and which are arcuate in shape as shown in FIG. 4 terminating just short of the axis of the post. Fins 6 are integrally attached to a substantially hemispherically shaped portion 7 which is fastened to the post by any suitable fastening means, such as by bolts 8.

Figure 6:
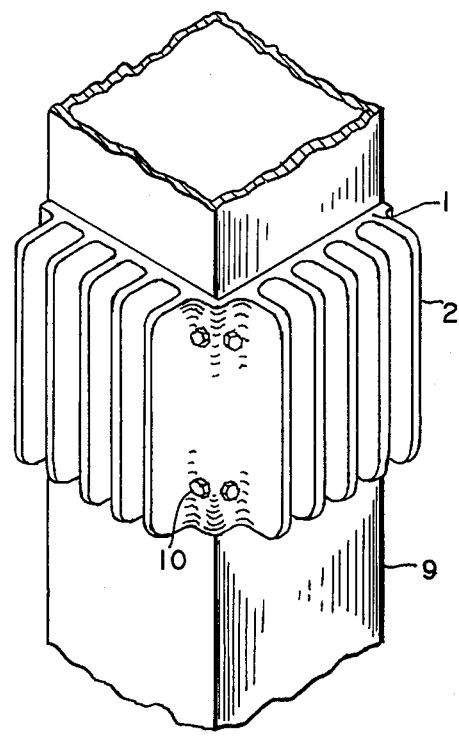
FIG. 6 is a top, perspective view of a further modification of the bumper as applied to all four sides of a square post.

FIG. 6 is a top, perspective view of still another modification of a bumper similar to that shown in FIG. 1 but wrapped around the four sides of a square post 9. The bumper may be fastened by bolts 10 extending through holes formed in the base 1 adjacent to corners and at other intermediate points if desired.

Figure 7:
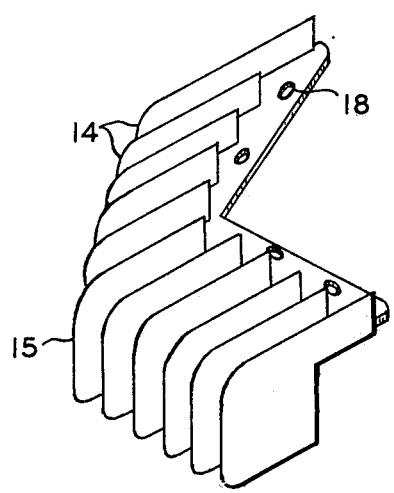
FIGS. 7 and 8 are top and bottom perspective views, respectively, of a further modification in the form of a corner bumper for protecting the corner of an object (not shown)
Figure 8:
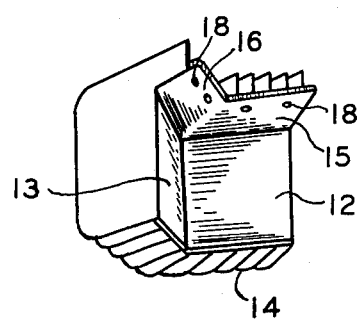

FIGS. 7 and 8 show a further modification which may be rigidly attached to the corner or corners of a truck cabin or the like to protect the cabin from injury as the result of a collision with stationary objects, such as the side of a wall or building serviced by the truck. The resilient bumper may also be used on the corners of a stationary object. It comprises two base portions 12 and 13 at right angles, from which base portions emerge a multiplicity of spaced adjacent or parallel fins 14 having ends which are offset relative to each other, coming to a peak 15 at the juncture of the two right angular base portions 12 and 13.

Integral with base portions 12 and 13 are right angular flanges 15 and 16 from which emerge, at an angle of 45°, a multiplicity of continuations of said fins 14 so as to protect both sides and top of the truck cabin extending at right angles. Base portions 15 and 16 rest on top of the truck cabin and may be fastened thereto by bolts extending through holes 18.

Figure 9:
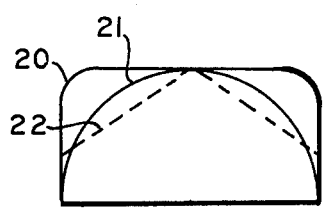
FIG. 9 is a plan view showing various shapes of fins that may be used.

FIG. 9 shows typical shapes for each fin. They may be substantially rectangular with rounded corners, as denoted by numeral 20, or they may be arcuate as shown by numeral 21, or triangular as shown by numeral 22, or of polygonal shape (not shown) or other desired shapes.

Figure 11:
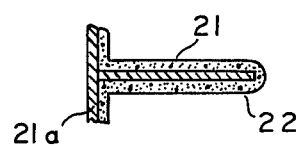
FIG. 11 is a cross-sectional view taken along line XI—XI of FIG. 10.
Figure 10:
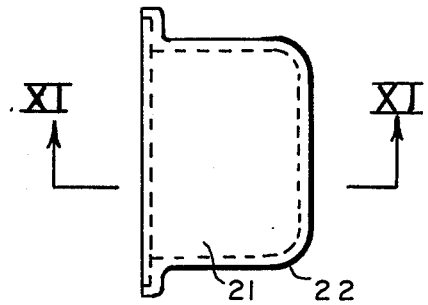
FIG. 10 is a plan view showing a reinforced fin.

FIGS. 10 and 11 show a modification of any of the above described bumpers wherein reinforcement 21 of spring metal or other suitable hard material with an integral base 21a is integrally covered, such as by coating, by an outer covering 22 of tough rubber or plastic material, such as described above. Such reinforcement may be used to provide greater resistance against flexing or simply, by the use of spring metal reinforcement 21, to provide a filler for obtaining substantially the same resiliency but saving on the amount of rubber or plastic material required for the bumper.

Thus it will be seen that we have provided a highly efficient resilient bumper for use on corners of a truck cabin or on flat surfaces of vehicles or conveyances, such as boats, or on stationary objects, such as docks, posts, flat wall, etc. which are subject to collision with moving objects, such as vehicles; furthermore, we have provided a finned construction of such bumper that enables progressive contact of the respective fins to provide progressively higher resistance to flexing so as to avoid shocks, without minimizing the useful characteristics as a consequence of wide variations in temperatures, particularly those below 0° F.

While we have illustrated and described several embodiments of our invention, it will be understood that these are by way of illustration only and that various changes and modifications may be contemplated in our invention and within the scope of the following claims.

We claim:

1. A bumper for attachment to a surface to be protected against collision, comprising a base portion having two integral parts of substantially equal length extending at right angles to each other for attachment to a corner of an object to be protected and a plurality of integral upstanding fins which are parallel and which extend at an angle of less than 90° from said base portion, also which fins are so closely spaced apart that an object colliding therewith will cause the fins to flex and to contact each other progressively so as to offer progressively greater resistance to collision, said base portion and fins being of resilient material.

2. A bumper as recited in claim 1 wherein said resilient material is a urethane resin having an ultimate tensile strength of about 7700 psi, an ultimate elongation of about 540%, a tensile modulus of about 1250 psi at 100% elongation, a tear strength of about 650 pli, and a shore hardness "A" scale of about 91.

3. A bumper as recited in claim 1 together with a metallic reinforcement for said base portion and for said fins, the reinforcement for said fins being of resilient material and integrally attached to said base portion metallic reinforcement.

4. A bumper as recited in claim 1 wherein said fins are of substantially rectangular shape with rounded corners.

5. A bumper as recited in claim 1 wherein said fins are of substantially semi-circular in shape.

6. A bumper as recited in claim 1 wherein said fins are of substantially triangular shape.

7. A bumper as recited in claim 1 wherein all said fins are of substantially equal height and are disposed at 45° relative to said two integral parts of said base portion.

8. A bumper as recited in claim 1 wherein integral fastening flanges extend at right angles from said two integral parts for resting on the top surface of a corner of an object to be protected and having holes through which fastening means may be extended into the object, all said fins integrally extending upwardly and parallely from said two integral parts so as to afford protection of the top portion of the object.

9. A bumper as recited in claim 1 wherein said fins are of resilient material having more than 300% elongation at 0° F., a tear strength of more than 400 lbs. per linear inch in the temperature range zero to 125°F. and high abrasion resistance.

10. A bumper as recited in claim 9 wherein said fins are of urethane elastomer.

11. A bumper as recited in claim 12 wherein the ends of said fins are disposed along a right angular path and wherein said resilient material is of rubber having relatively high tear strength.

* * * * *